US010161353B2

(12) United States Patent
Oso et al.

(10) Patent No.: US 10,161,353 B2
(45) Date of Patent: Dec. 25, 2018

(54) PISTON FOR ENGINE

(71) Applicant: KUBOTA Corporation, Osaka-shi, Osaka (JP)

(72) Inventors: Hiroki Oso, Sakai (JP); Hideyuki Koyama, Sakai (JP); Takahiro Yamazaki, Sakai (JP); Kentaro Nagai, Sakai (JP); Rina Kaneko, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 56 days.

(21) Appl. No.: 15/609,195

(22) Filed: May 31, 2017

(65) Prior Publication Data

US 2017/0350344 A1 Dec. 7, 2017

(30) Foreign Application Priority Data

Jun. 1, 2016 (JP) ................................ 2016-109746

(51) Int. Cl.
*F16J 1/08* (2006.01)
*F02F 3/10* (2006.01)

(52) U.S. Cl.
CPC ..................................... *F02F 3/10* (2013.01)

(58) Field of Classification Search
CPC ...................................... F02F 3/10; F16J 1/08
USPC ........................................................... 92/155
See application file for complete search history.

(56) References Cited

U.S. PATENT DOCUMENTS

| | | | | |
|---|---|---|---|---|
| 7,171,936 B2 * | 2/2007 | Rein | F02F 3/105 123/193.4 |
| 9,086,030 B2 * | 7/2015 | Suzuki | F16J 1/08 |
| 9,581,105 B2 * | 2/2017 | Kuniyasu | F02F 3/10 |
| 9,885,312 B2 * | 2/2018 | Hirosawa | F02F 3/042 |
| 10,018,147 B2 * | 7/2018 | Oso | F02F 3/10 |
| 2005/0087166 A1 | 4/2005 | Rein et al. | |

FOREIGN PATENT DOCUMENTS

| | | |
|---|---|---|
| JP | 2010112357 A | 5/2010 |
| JP | 4749399 B2 | 8/2011 |
| JP | 2014234739 A | 12/2014 |

OTHER PUBLICATIONS

Extended European Search Report dated Sep. 29, 2017 in EP Application No. 17168835.1.

* cited by examiner

*Primary Examiner* — Michael Leslie
(74) *Attorney, Agent, or Firm* — Panitch Schwarze Belisario & Nadel LLP

(57) ABSTRACT

A piston for an engine is provided, that makes it possible to improve supply of engine oil to a recessed part thereof. The piston includes a resin coating film and a recessed part on a surface of a skirt part. In the piston, resin coating films are distributed in a patchy fashion on the surface of the skirt part. The recessed part is formed by the surface of the skirt part, between adjacent surfaces of the patchy resin coating films and by the adjacent resin coating films, forming a net-like groove. An outer-edge resin coating film, extending in a piston movement direction, is provided at the ends, in a piston circumferential direction of the skirt part.

9 Claims, 9 Drawing Sheets

PISTON FOR ENGINE

BACKGROUND OF THE INVENTION (1) Field of the Invention

The present invention relates to a piston for an engine.

(2) Description of Related Art

Conventionally, a piston that has a resin coating film and recessed parts on a surface of a skirt part for the purpose of reducing piston slap noise and reducing friction of the skirt part is known as a piston for an engine.

SUMMARY OF THE INVENTION

However, according to this conventional art, in which the plurality of recessed parts are discretely disposed in spots in the single continuous resin coating film, the function of reducing friction of the skirt part is insufficient because it is difficult to supply oil to the recessed parts.

An object of the present invention is to improve supply of engine oil to a recessed part of a piston for an engine which has a resin coating film and recessed parts on a surface of a skirt part.

The present invention concerns a piston for an engine, the piston including a resin coating film and a recessed part on a surface of a skirt part, wherein resin coating films are distributed in a patchy fashion on the surface of the skirt part, and the recessed part, which is formed by the surface of the skirt part between adjacent ones of the patchy resin coating films and by the adjacent resin coating films, constitutes a net-like groove, and wherein outer-edge resin coating films extending in a piston movement direction are provided at ends, in a piston circumferential direction, of the skirt part.

According to the present invention, an engine oil holding region can be formed throughout a wide range of the skirt part. Since the resin coating films are distributed in a patchy fashion and the recessed part formed between the patchy resin coating films constitutes the net-like groove on the surface of the skirt part, an engine oil holding region can be formed throughout a wide range of the skirt part.

Since the surface of the skirt part are textured so as to be divided into a plurality of parts, an engine oil passage in the piston movement direction can be provided. This makes it possible to more effectively supply engine oil to each portion. Since the net-like groove is formed by the recessed part, oil can be actively supplied to the recessed part by using reciprocating movement of the piston.

Since both ends, in the piston circumferential direction, of the net-like groove formed by coating of the resin coating films on the skirt part are closed or narrowed by the outer-edge resin coating film, it is harder for engine oil introduced into the skirt part to escape in the piston circumferential direction, and it is therefore easier to hold oil in the skirt part (mainly in the net-like groove).

Since oil can be efficiently held in the skirt part, positive pressure is generated in a fluid membrane produced by oil. This floats sliding surfaces, thereby reducing friction. It is therefore anticipated that fuel consumption is reduced. Furthermore, seizure resistance of the engine improves. In particular, oil can be held even in the cold.

As a result, it is possible to provide a piston for an engine that makes it possible to improve supply of engine oil to a recessed part of a piston coated with a resin coating film.

BRIEF DESCRIPTION OF THE DRAWINGS

FIG. 2A is a side view of a piston, and FIG. 2B illustrates a coating pattern of a main part;

FIG. 3A is a side view of a piston, and FIG. 3B illustrates a coating pattern of a main part;

FIG. 5A is a side view of a piston, and FIG. 5B illustrates a coating pattern of a main part;

DETAILED DESCRIPTION OF PREFERRED EMBODIMENTS

Figure 1:
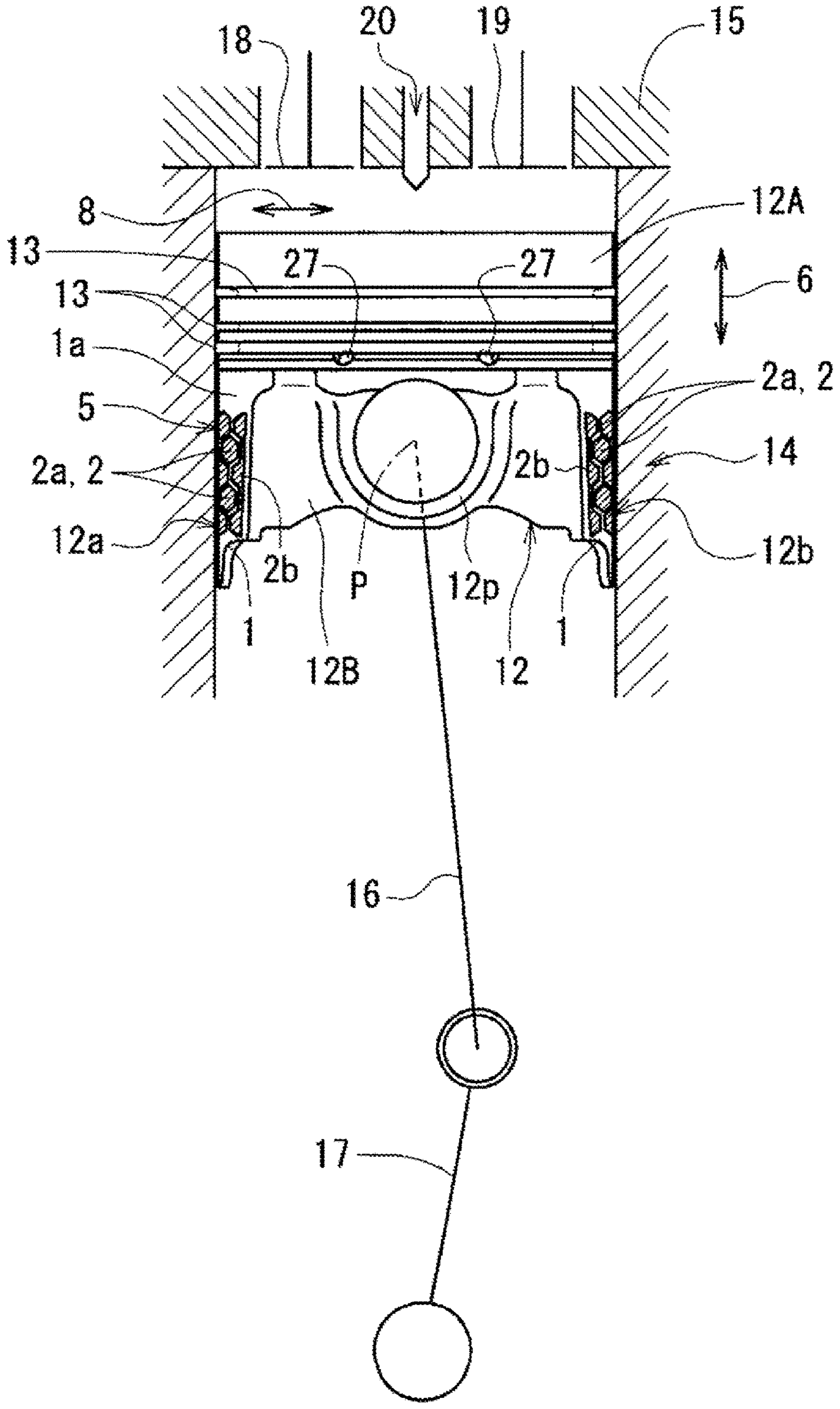
FIG. 1 is a vertical cross-sectional view illustrating a piston fitted into a cylinder and other parts.

Embodiments of a piston according to the present invention is described below with reference to the drawings. The following discusses a piston for a vertical-type diesel engine as the piston according to the present invention. In the drawings, for simplification of illustration, a resin coating film 2 of a skirt part 1 that is a cylindrical surface is illustrated in an unfolded state. Hereinafter, engine oil that is lubricating oil is simply referred to as oil.

As illustrated in FIG. 1, a vertical-type diesel engine and a piston thereof are configured such that a cylinder head 15 is mounted on an upper part of a cylinder 14, a piston 12 is fitted into the cylinder 14, and a crankshaft 17 is interlocked with the piston 12 with a connecting rod 16 interposed therebetween.

An air intake valve 18, an air release valve 19, and a fuel injector 20 are attached to the cylinder head 15.

Figure 2A:
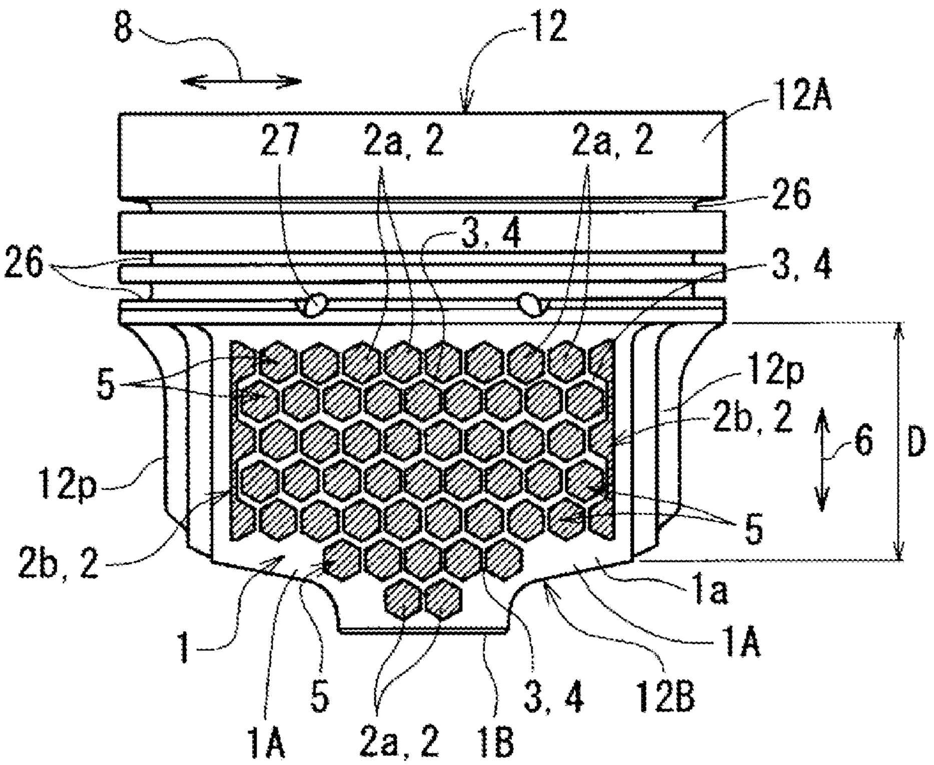
FIGS. 2A and 2B illustrate a resin coating film according to a first embodiment.

As illustrated in FIGS. 1 and 2A, the piston 12 has a piston head part 12A equipped with a piston ring 13 (not illustrated in FIGS. 2A and 2B) and a piston lower part 12B provided below the piston head part 12A. The piston lower part 12B does not have a cylindrical shape unlike the piston head part 12A and is an odd-shaped part including a pair of skirt parts 1 having an arc surface when viewed in a piston movement direction 6 and a pin connecting part 12*p* provided between the pair of skirt parts 1. The skirt parts 1 are provided so as to be located on a thrust side 12*a* and an anti-thrust side 12*b*, respectively.

As illustrated in FIGS. 1 and 2A, each of the skirt parts 1 is shaped so as to have circumferentially end parts 1A and 1A each having an inclined edge on a crankshaft side in the piston movement direction 6 and a circumferentially central part 1B protruding toward the crankshaft side between the circumferentially end parts 1A. That is, the skirt part 1 is shaped so as to be inclined downward toward the center in a piston circumferential direction 8. FIG. 1 illustrates the piston 12 that is moving downward. A circumferential groove 26 for attachment of the piston ring 13 (see FIG. 1) and an oil hole 27 are also provided.

The skirt part 1 of the piston 12 has, on a surface 1*a* thereof, a resin coating film 2 and a recessed part 3 formed by the resin coating film 2. A main body of the piston 12 is made of a metal such as cast iron or an aluminum alloy. The resin coating film 2 is made of a resin such as a polyamide resin, an epoxy resin, a phenolic resin, a silicone resin, or a polyimide resin. The resin coating film 2 contains an inorganic solid lubricant such as a transition metal oxide or graphite.

Next, for example, the resin coating film 2 and the recessed part 3 provided on the skirt part 1 and a coating pattern of the resin coating film 2 are described.

First Embodiment

Figure 2B:
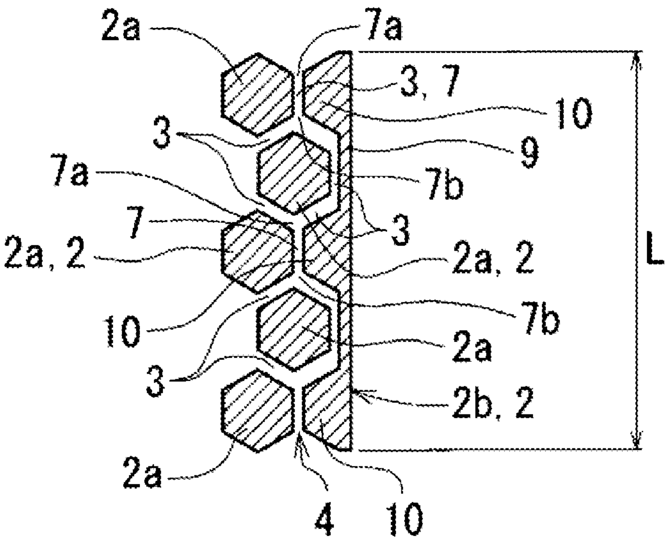

As illustrated in FIGS. 2A and 2B, resin coating films 2*a* (an example of the resin coating film 2) are distributed in a patchy fashion on the surface 1*a* of the skirt part 1, and a net-like groove 4 is formed by the recessed part 3 formed by the surface 1*a* of the skirt part 1 between adjacent patchy resin coating films 2*a* and the adjacent patchy resin coating films 2*a* and 2*a*. The net-like groove 4 is formed between the patchy resin coating films 2*a* and 2*a*, and an inner bottom surface of the net-like groove 4 is the metal surface 1*a* of the skirt part 1 that is not covered with the patchy resin coating films 2*a*.

The patchy resin coating films 2*a* and the recessed part 3 that are provided on the skirt part 1 are located on the thrust side 12*a* and the anti-thrust side 12*b* of the piston 12. The thrust side 12*a* is a side on which the piston 12 is pressed against the cylinder 14 by explosive pressure when the piston 12 moves downward due to rotation direction of the crankshaft 17 and inclination of the connecting rod 16 in an explosion step, and the anti-thrust side 12*b* is a side opposite to the thrust side 12*a*.

As illustrated in FIG. 2A, each of the patchy resin coating films 2*a* has a hexagonal shape (regular hexagon) and is provided on the surface 1*a* of the piston 12 so as to be regularly aligned vertically and laterally with a slight gap (=the recessed part 3=the net-like groove 4) between adjacent patchy resin coating films 2*a* and 2*a*.

Accordingly, adjacent patchy resin coating films 2*a* and 2*a* overlap each other in the piston movement direction 6 and the piston circumferential direction 8. In the example of FIG. 2A, five (or six) patchy resin coating films 2*a* are aligned in the piston movement direction 6 in the circumferentially end parts 1A, and seven (or six) patchy resin coating films 2*a* are aligned in the piston movement direction 6 in the circumferentially central part 1B. That is, the resin coating film 2 has a coating pattern such that a large number of turtle-shell-like resin coating films 2*a* are aligned vertically and laterally.

A plurality of patchy resin coating films 2*a* are disposed at predetermined intervals in the piston circumferential direction 8 of the skirt part 1 so as to constitute a resin coating film row 5, and a plurality of resin coating film rows 5 are aligned in the piston movement direction 6 so as to be shifted by a half pitch from one another in the piston circumferential direction. As a result, the patchy resin coating films 2*a* are disposed in a plurality of rows in a staggered pattern.

Each of openings 7*a* and 7*b* at both ends, in the piston movement direction 6, of a groove part 7 (=the recessed part 3) formed between adjacent patchy resin coating films 2*a* and 2*a* of each resin coating film row 5 faces a patchy resin coating film 2*a* of a resin coating film row 5 that is adjacent in the piston movement direction 6, more specifically, faces a center, in the piston circumferential direction 8, of the patchy resin coating film 2*a*.

As illustrated in FIGS. 2A and 2B, an outer-edge resin coating film 2*b* extending in the piston movement direction 6 is provided at both ends, in the piston circumferential direction 8, of the skirt part 1 (=ends of the circumferentially end parts 1A). The outer-edge resin coating film 2*b* is a resin coating film 2 that is long and large in the piston movement direction 6. More specifically, the outer-edge resin coating film 2*b* has a rectangular band-like part 9 that is long in the piston movement direction 6 and three crosswise half parts 10 of the patchy resin coating films 2*a* that are added to respective alternate positions of the rectangular band-like part 9.

A vertical length L that is a length, in the piston movement direction 6, of the outer-edge resin coating film 2*b* is set to such a degree as to stretch over the entire length, in the piston movement direction, of an end, in the piston circumferential direction, of the skirt part 1. More specifically, the vertical length L stretches over the five resin coating film rows 5 that are aligned in the piston movement direction 6 and is slightly shorter than an entire length D (see FIG. 2A), in the piston movement direction 6, of the surface 1*a* of the piston 12 at the ends of the circumferentially end parts 1A.

In the piston 12 according to the first embodiment, an oil holding region can be formed throughout a wide range of the skirt part 1. Since a large number of resin coating films 2*a* are distributed in a patchy fashion and the recessed part 3 that is formed between the patchy resin coating films 2*a* forms the net-like groove 4 on the surface 1*a* of the skirt part 1, the oil holding region can be formed throughout a wide range of the skirt part 1.

The recessed part 3 that is formed between patchy resin coating films 2*a* that are adjacent in the piston circumferential direction 8 of the skirt part 1 is adjacent to other patchy resin coating films 2*a* in the piston movement direction 6. This allows oil flowing out from the openings at both ends of the recessed part 3 due to reciprocating movement of the piston 12 to collide with patchy resin coating films 2*a* that are adjacent in the piston movement direction 6, thereby reducing flow of engine oil out of the recessed part 3. It is therefore possible to increase the oil holding function of the net-like groove 4.

Since the surface 1*a* of the skirt part 1 is textured so as to be divided into plural parts, a passage for oil in a top-bottom direction (the piston movement direction 6) can be provided. This allows oil to be more effectively supplied to each portion. Since the resin coating film rows 5 and 5 that are adjacent in the piston movement direction 6 are shifted from one another in the piston circumferential direction 8 so that the patchy resin coating films 2*a* are arranged in a staggered pattern, oil can be actively supplied to the recessed part 3 by using reciprocating movement of the piston 12.

Since both ends, in the piston circumferential direction 8, of the net-like groove 4 that is formed by coating of the resin coating films 2, 2*a*, and 2*b* on the skirt part 1 are closed by the outer-edge resin coating film 2*b*, it is harder for oil introduced into the skirt part 1 to escape in the piston circumferential direction. That is, oil is more likely to be held in the skirt part 1 (mainly in the net-like groove 4). The resin coating film 2 can be made in contact with a cylinder liner in a portion having large rigidity at both ends, in the piston circumferential direction 8, of the skirt part 1.

Since oil can be efficiently held in the skirt part 1, positive pressure is generated in a fluid membrane produced by oil. This floats sliding surfaces, thereby reducing friction. It is therefore anticipated that fuel consumption can be reduced. Furthermore, seizure resistance of the engine improves. In particular, oil can be held even in the cold.

Second Embodiment

Figure 3A:
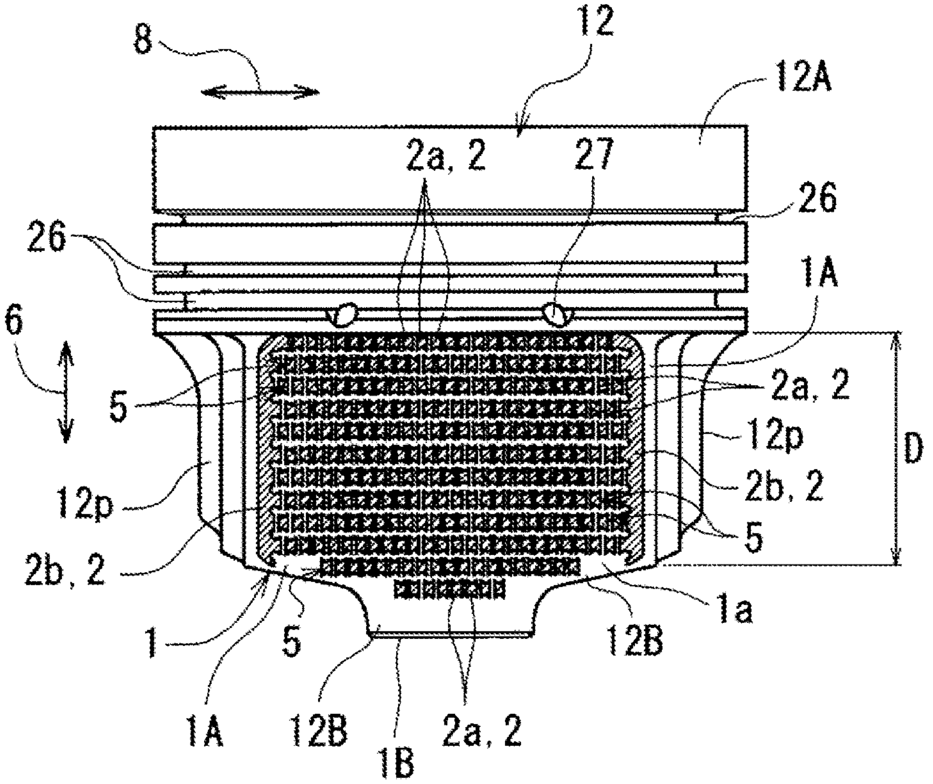
FIGS. 3A and 3B illustrate a resin coating film according to a second embodiment.
Figure 3B:
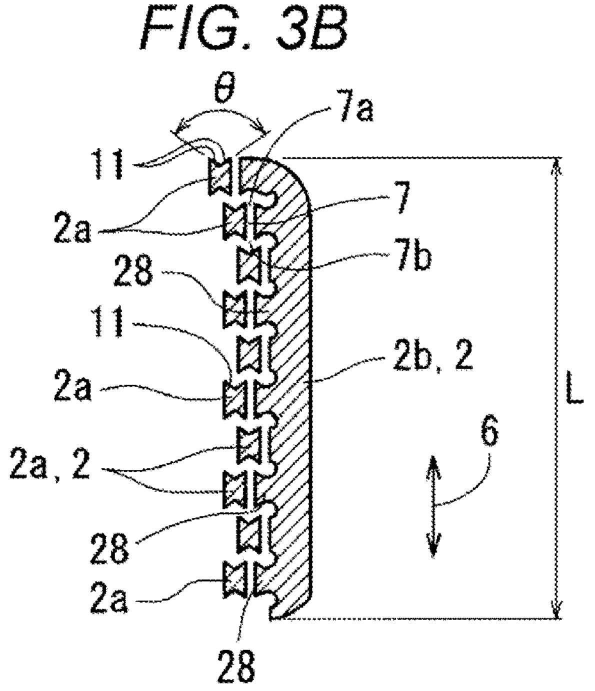

The piston 12 may be coated with the resin coating film 2 in a pattern illustrated in FIGS. 3A and 3B. A large number of patchy resin coating films 2*a* each have an hourglass shape, more specifically a shape of an hourglass that is slightly longer in the piston movement direction 6, as illustrated in FIGS. 3A and 3B. As in the first embodiment, patchy resin coating films 2*a* are regularly aligned in the piston circumferential direction 8 so as to constitute a resin coating film row 5, and a plurality of resin coating film rows 5 are aligned in the piston movement direction 6 so as to be shifted by a half pitch from one another in the piston circumferential direction, so that the resin coating films 2*a* are arranged in a plurality of rows in a staggered pattern.

Accordingly, each of openings 7*a* and 7*b* at both ends, in the piston movement direction 6, of a groove part 7 (=the recessed part 3) formed between adjacent patchy resin coating films 2*a* and 2*a* of each resin coating film row 5 faces a patchy resin coating film 2*a* of a resin coating film row 5 that is adjacent in the piston movement direction 6, more specifically, a center, in the piston circumferential direction 8, of the patchy resin coating film 2*a*, as illustrated in FIG. 3B.

In the piston 12 according to the second embodiment, an included angle θ formed between left and right end surfaces 11 and 11 of a V-shaped end, in the piston movement direction 6, of each patchy resin coating film 2*a* is set to 120 degrees (or 120 degrees±20 degrees). Although an effect can be produced by setting θ to a range of 60 degrees≤θ<180 degrees, the range "120 degrees±20 degrees" is preferable to achieve a better effect.

In the piston 12 according to the second embodiment, lubricating oil moving in the recessed part 3, i.e., the groove part 7 between patchy resin coating films 2*a* and 2*a* adjacent in the piston circumferential direction 8 flows out of the opening 7*a*, collides with and is received by an end of a patchy resin coating film 2*a* adjacent in the piston movement direction 6, and is bounced back by the pair of end surfaces 11 and 11 in accordance with movement (rising and falling movement) of the piston 12.

A saw-tooth-like recessed part that is formed by ends of adjacent patchy resin coating films 2*a* and extends in the piston circumferential direction 8 is configured to serve as an oil accumulating groove that is excellent in lubricating oil holding function.

As illustrated in FIGS. 3A and 3B, an outer-edge resin coating film 2*b* extending in the piston movement direction 6 is provided at ends, in the piston circumferential direction 8, of the skirt part 1. A length L, in the piston movement direction, of the outer-edge resin coating film 2*b* is set to such a degree as to stretch over an entire length D, in the piston movement direction 6, of an end, in the piston circumferential direction 8, of the skirt part 1.

Also in this case, the outer-edge resin coating film 2*b* is a vertically long part that connects endmost patchy resin coating films 2*a*, in the piston circumferential direction 8, of a plurality of (10) resin coating film rows 5 aligned in the piston movement direction 6 and has projections 28 facing inward in the piston circumferential direction 8 so as to encompass the patchy resin coating films 2*a*.

Third Embodiment

Figure 4A:
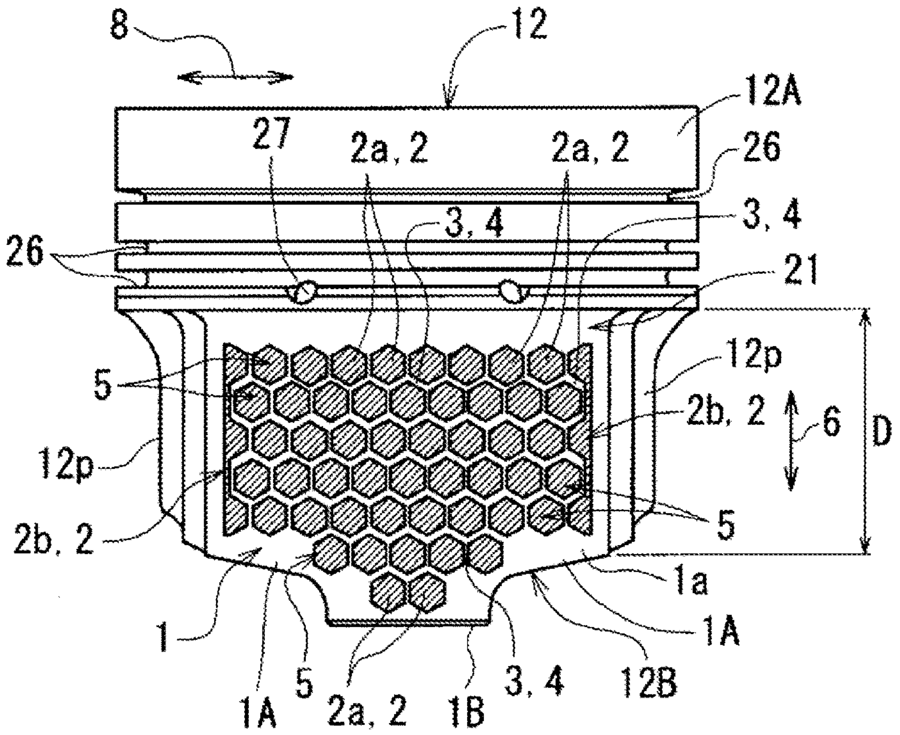
FIG. 4A illustrates a piston having a first alternative structure in which a recessed part is provided at an upper end of a skirt part of the piston of FIGS. 2A and 2B.

As illustrated in FIG. 4A, the piston 12 of FIG. 2A may be arranged so that no resin coating film 2 is provided at an upper end of the skirt part 1. Specifically, it is also possible to employ a piston 12 in which an uppermost resin coating film row 5 is slightly separated downward from an upper edge of the skirt part 1 (by a vertical width approximately corresponding to a single patchy resin coating film 2*a*). That is, a band-like bear part 21 is formed by a surface 1*a* on which no resin coating film 2 is provided and that is long in the piston circumferential direction 8.

Figure 4B:
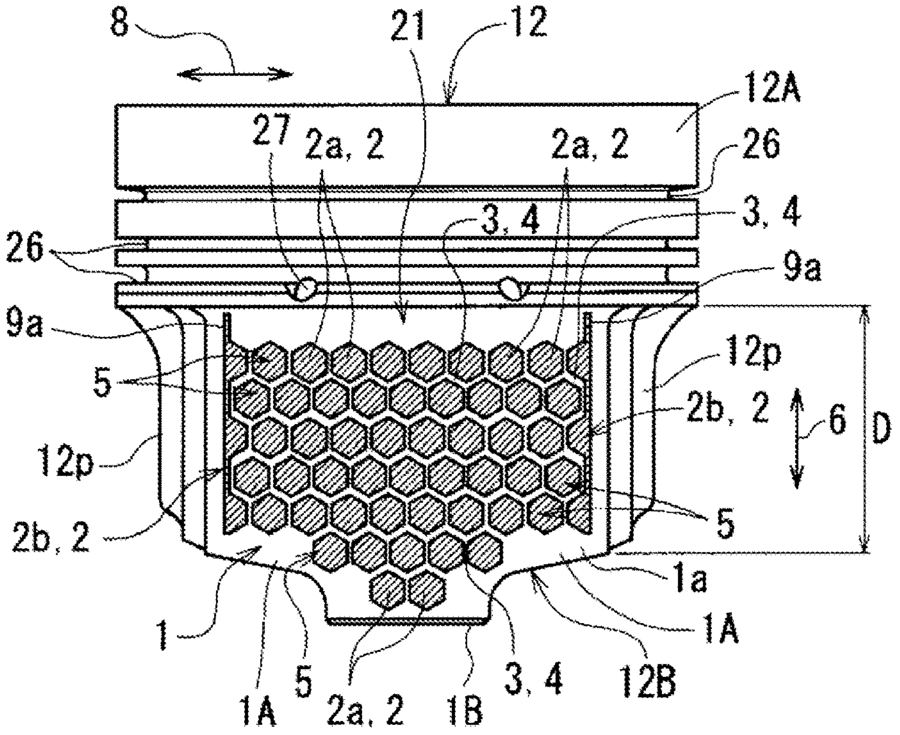
FIG. 4B illustrates a piston having a second alternative structure in which a resin coating film is provided at sides of the recessed part.

Furthermore, it is also possible to employ a piston 12 in which an extended band part 9*a* extending upward from a band-like part 9 of an outer-edge resin coating film 2*b* is provided so that both sides, in the piston circumferential direction 8, of the band-like bear part 21 is blocked in the piston circumferential direction 8, as illustrated in FIG. 4B.

Since the band-like bear part 21 having no resin coating film 2 is provided at the upper end of the skirt part 1, it is easier to introduce oil from the band-like bear part 21 into a portion of the resin coating film 2, for example, a net-like groove 4. In cases where the band-like bear part 21 having the extended band part 9*a* that is a wall of the resin coating film 2 is provided in the piston circumferential direction 8 as illustrated in FIG. 4B, it is easier to take oil into the resin coating film 2.

Fourth Embodiment

Figure 5A:
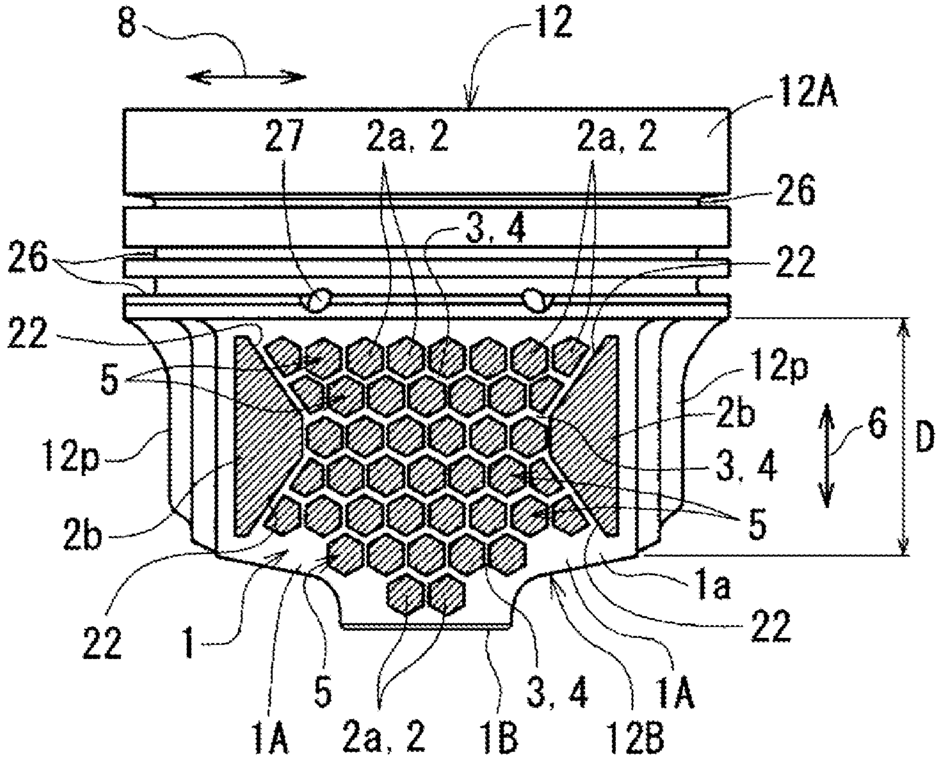
FIGS. 5A and 5B illustrate a resin coating film according to a third embodiment.

It is also possible to employ a piston 12 in which outer-edge resin coating films 2*b* at respective ends, in a piston circumferential direction 8, of the skirt part 1 are shaped so that central parts thereof in the piston movement direction 6 bulge in the piston circumferential direction 8, more specifically, bulge inward (toward each other), as illustrated in FIG. 5A. Each of the outer-edge resin coating films 2*b* illustrated in FIG. 5A has a substantially triangular shape from which three corners are missing in a vertically symmetrical manner, and patchy resin coating films 2*a* that are adjacent to the outer-edge resin coating films 2*b* have a shape of a turtle shell that is partially removed so that a recessed part 3 that is a gap is formed between the patchy resin coating films 2*a* and the outer-edge resin coating films 2*b*.

Figure 5B:
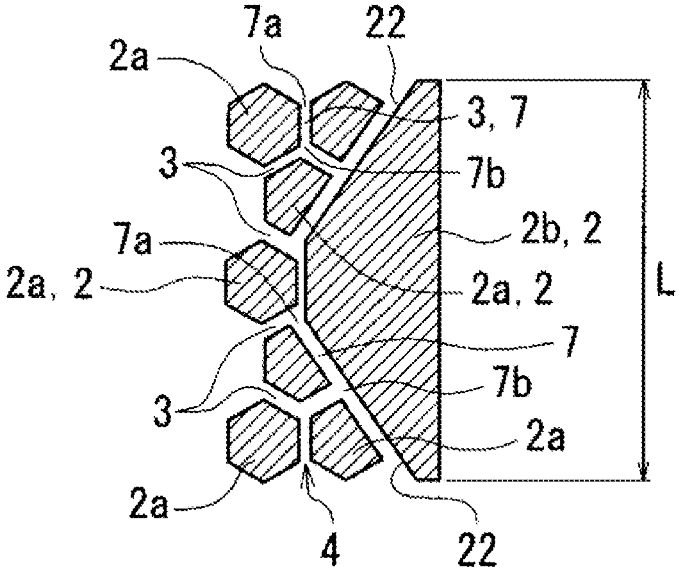

In the piston 12 having the bulging outer-edge resin coating films 2*b*, oil can be guided by upper and lower inclined sides 22 and 22 to a central part, in the piston circumferential direction 8, of the skirt part 1, i.e., to a part that strongly makes contact with the cylinder 14 (see FIG. 1) in accordance with upward and downward sliding movement, as illustrated in FIG. 5B. The piston 12 is configured such that a net-like groove 4 becomes narrower toward the central part in the piston movement direction 6, and a flow passage becomes narrow accordingly.

Fifth Embodiment

Figure 6A:
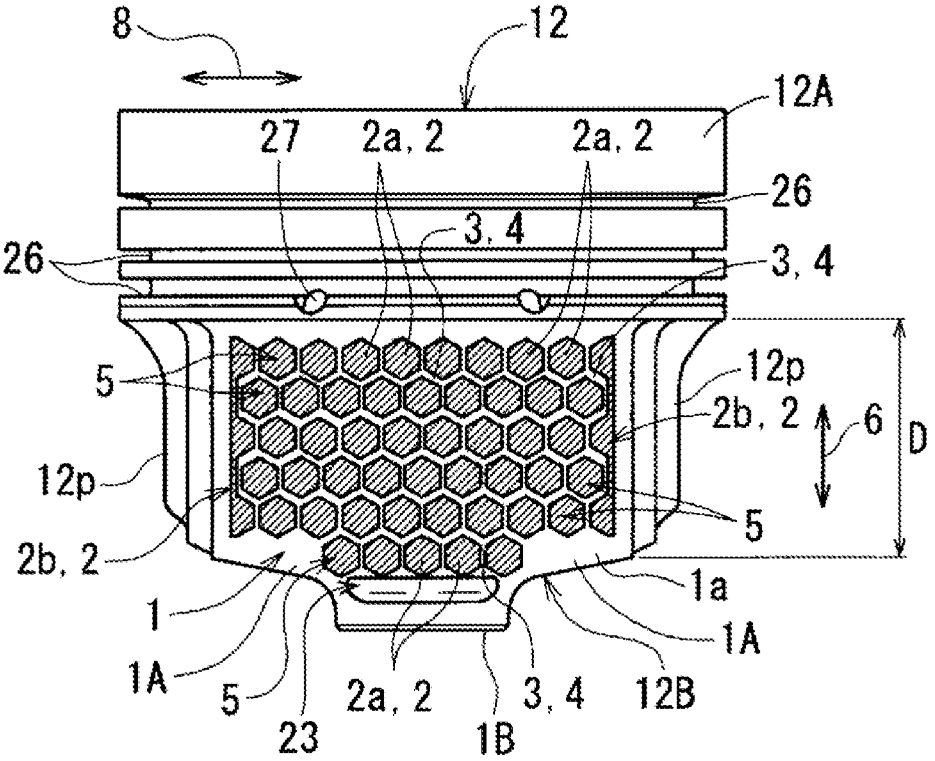
FIG. 6A illustrates a piston having a second alternative structure in which a recessed part is provided at a lower end of the skirt part of the piston of FIGS. 2A and 2B.
Figure 6B:
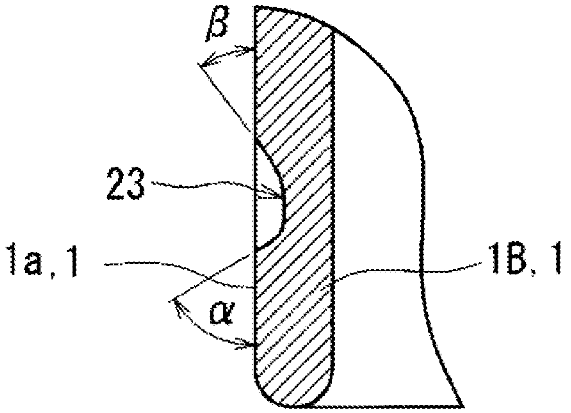
FIG. 6B is a cross-sectional view of the recessed part.

It is also possible to employ a piston 12 in which a recessed pocket part 23 that is a recess of the surface 1*a* of the skirt part 1 is provided at an end, in the piston movement direction 6, of the skirt part 1, as illustrated in FIG. 6A. The recessed pocket part 23 is provided at a lower end of the circumferentially central part 1B of the skirt part 1 so as to be located out of a range of the resin coating film 2 and is long in the piston circumferential direction 8 as illustrated also in FIG. 6B. The recessed pocket part 23 has a curved cross-sectional shape in which a lower recess inclination angle $\alpha$ is larger than an upper recess inclination angle $\beta$.

Since oil can be accumulated in the recessed pocket part 23, the recessed pocket part 23 can function as an oil pocket of the skirt part 1. Since the inclination angles of the recessed pocket part 23 are set to $\alpha>\beta$, oil is more easily accumulated in the recessed pocket part 23 when the piston 12 moves upward, and the accumulated oil can be supplied to the skirt part 1 when the piston 12 moves downward. In cases where the recessed pocket part 23 is provided at an upper end of the skirt part 1 (not illustrated), it is desirable that the angles be set in an opposite manner to those described above, specifically set to $\alpha<\beta$.

Sixth Embodiment

Figure 7A:
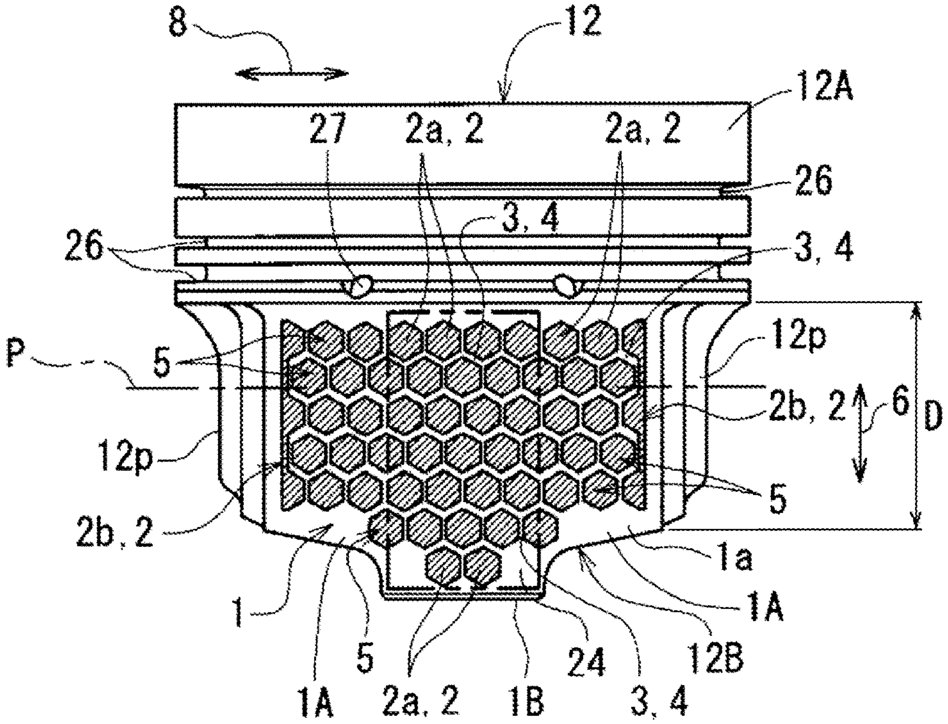
FIG. 7A is a side view of a piston obtained by performing shot-peening treatment on the piston of FIGS. 2A and 2B.

It is also possible to employ a piston 12 in which patchy resin coating films 2*a* provided on the surface 1*a* of the skirt part 1 in a direction that crosses a direction of an axis P of a piston pin (not illustrated) may be provided on a surface of the piston 12 that has been subjected to shot-peening treatment, i.e., a rough surface 24, as illustrated in FIG. 7A. More specifically, the rough surface 24 that has been subjected to shot-peening treatment is a part of the skirt part 1 that is surrounded by the virtual line, i.e., a part of the surface 1*a* that is in the circumferentially central part 1B.

The patchy resin coating films 2*a* coating the rough surface 24 that has been subjected to shot-peening treatment is less likely to peel off than patchy resin coating films 2*a* coating the normal surface 1*a* and therefore can contribute to an improvement of wear resistance.

Seventh Embodiment

Figure 7B:
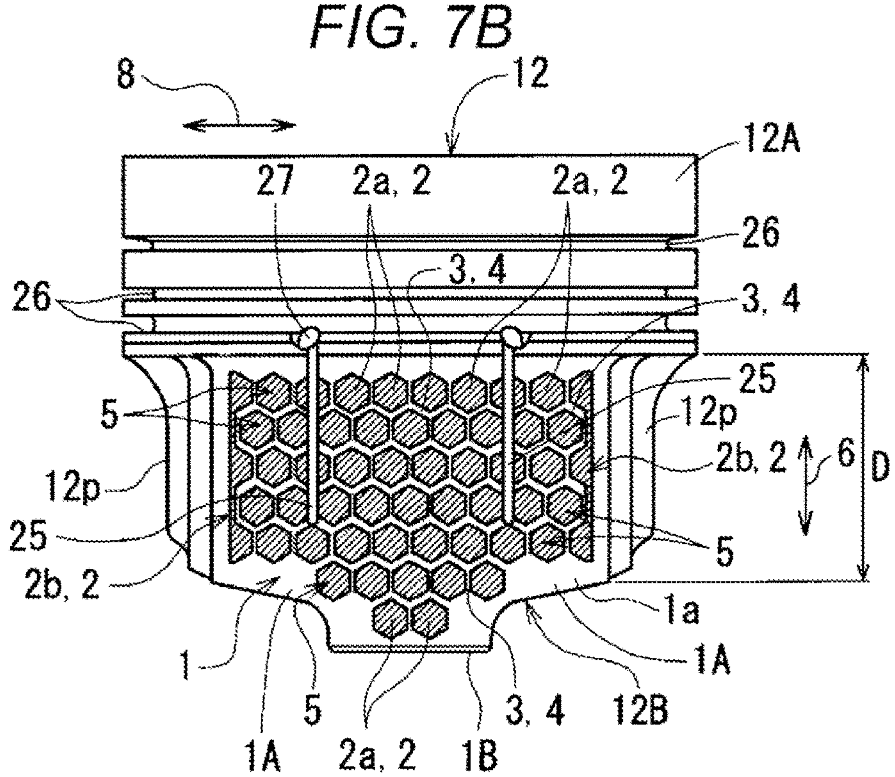
FIG. 7B is a side view of a piston obtained by forming a vertical oil groove in the piston of FIGS. 2A and 2B.

It is also possible to employ a piston 12 in which a groove 25 extending in the piston movement direction 6 is provided at ends of the respective circumferentially end parts 1A of the skirt part 1 that are close to the circumferentially central part 1B, as illustrated in FIG. 7B. Each groove 25 is an elongated vertical groove obtained by denting the surface 1*a*. An upper end of each groove 25 is continuous with the oil hole 27 provided in the circumferential groove 26 for attachment of a piston ring, and a lower end of each groove 25 extends to a halfway in the piston movement direction 6, more specifically, extends to a position that is slightly lower than a center, in the top-bottom direction, of the circumferentially end part 1A.

In the piston 12 according to the seventh embodiment, oil can be actively supplied to a portion of the resin coating film 2 through the grooves 25 in accordance with rising and falling movement of the piston 12. It is therefore less likely that shortage of an oil membrane occurs. This can contribute to an improvement of fuel consumption and prevention of noise.

Eighth Embodiment

Figure 8A:
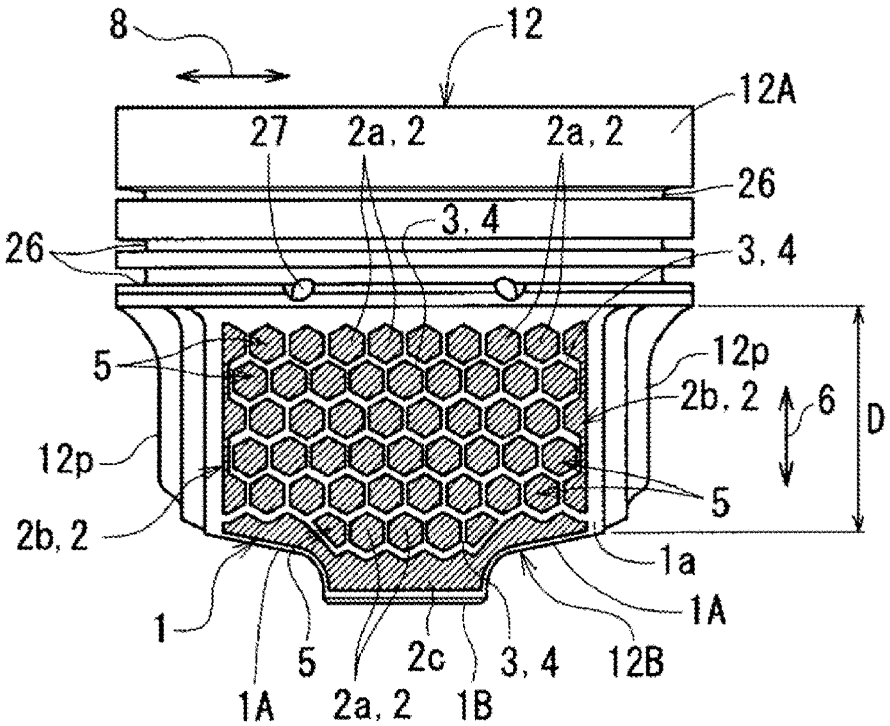
FIG. 8A is a side view of a piston having a resin coating film wall at a lower end of the skirt part of the piston of FIGS. 2A and 2B.
Figure 8B:
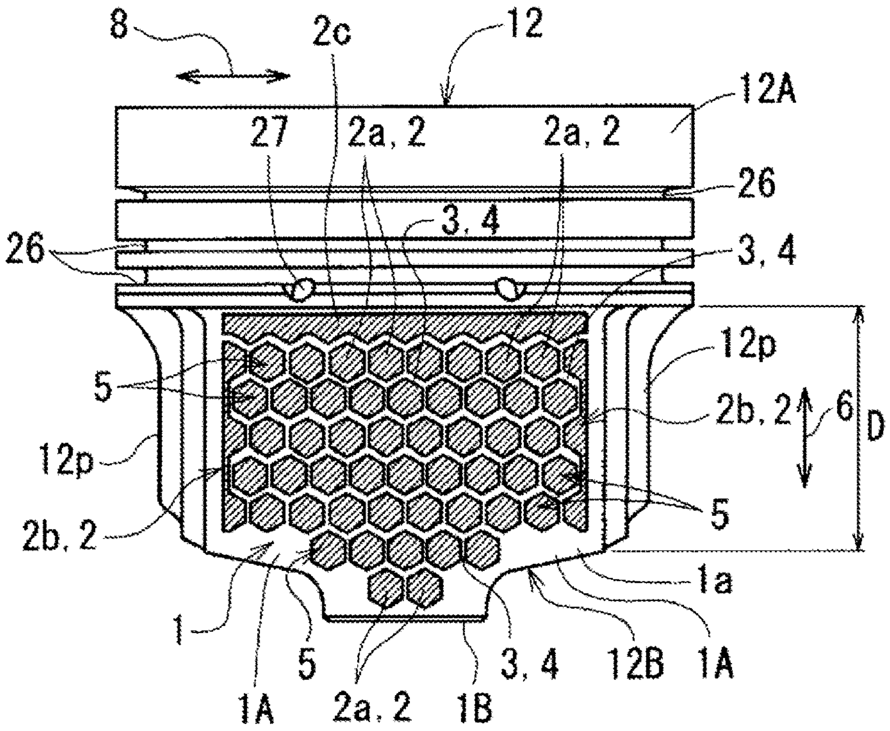
FIG. 8B is a side view of a piston having a resin coating film wall at an upper end of the skirt part of the piston of FIGS. 2A and 2B.

It is also possible to employ a piston 12 in which a circumferential resin coating film 2*c* extending in the piston circumferential direction 8 is provided at an end, closer to the crankshaft 17 (see FIG. 1), of the skirt part 1 on the anti-thrust side 12*b*, as illustrated in FIG. 8A. Alternatively, it is also possible to employ a piston 12 in which a circumferential resin coating film 2*c* extending in the piston circumferential direction 8 is provided at an end, farther from the crankshaft 17 (see FIG. 1), of the skirt part 1 on the thrust side 12*a*, as illustrated in FIG. 8B.

The circumferential resin coating film 2*c* provided at the lower end of the skirt part 1 is shaped along lower edges of the respective circumferentially end parts 1A and a lower edge of the circumferentially central part 1B, as illustrated in FIG. 8A. The circumferential resin coating film 2*c* provided at the upper end of the skirt part 1 has a shape that has a saw-tooth-like lower edge that matches patchy resin coating films 2*a* and a linear upper edge, as illustrated in FIG. 8B. The length, in the piston circumferential direction 8, of each of these circumferential resin coating films 2*c* is set to such a degree as to stretch over the entire length, in the piston circumferential direction 8, of the skirt part 1.

The circumferential resin coating film 2*c* illustrated in FIG. 8A also functions as a lower end continuous wall that covers, in the piston circumferential direction, a lower end of the net-like groove 4 of the skirt part 1 and can make it harder for oil taken into the net-like groove 4 to escape downward. The circumferential resin coating film 2*c* illustrated in FIG. 8B also functions as an upper end continuous wall that covers, in the piston circumferential direction, an upper end of the net-like groove 4 and can make it harder for oil taken into the net-like groove 4 to escape upward.

Ninth Embodiment

Figure 9A:
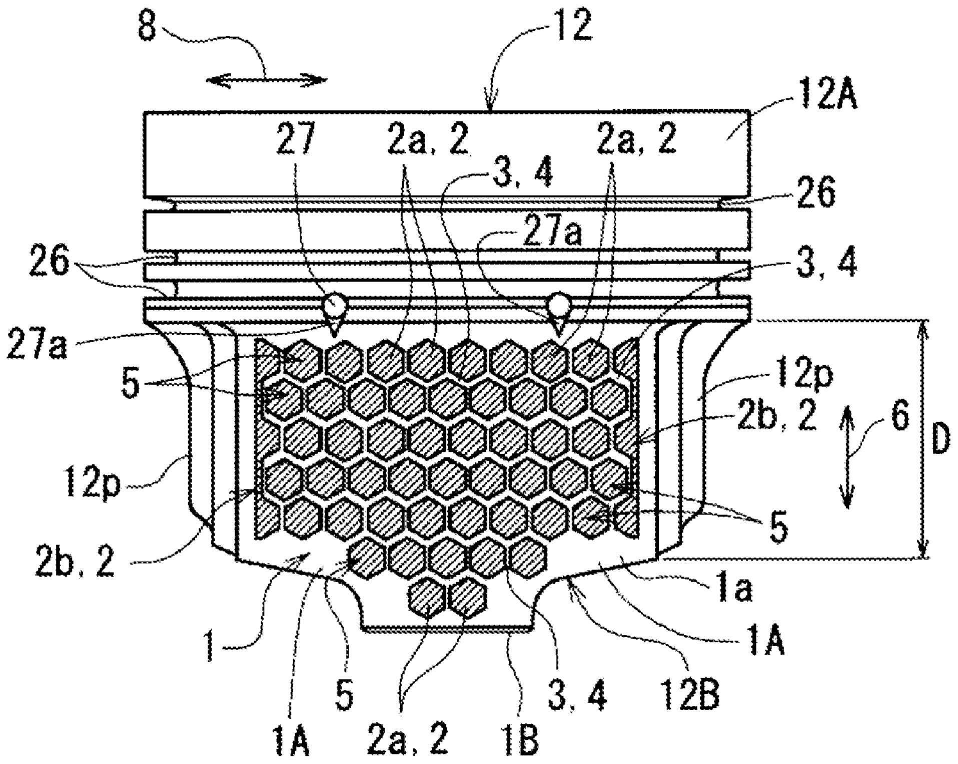
FIG. 9A is a side view of a piston having an oil hole having a cross section of a flowering shape.
Figure 9B:
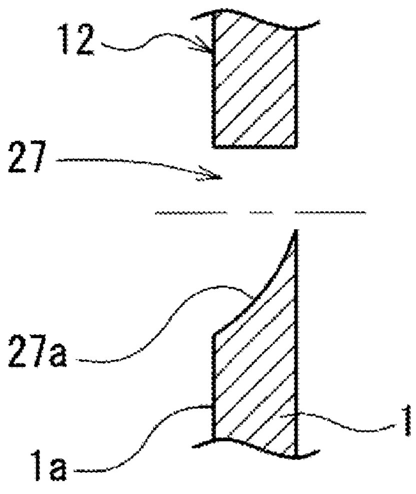
FIG. 9B is a cross-sectional view of an oil hole portion.

It is also possible to employ a piston 12 in which the oil hole 27 provided in a lowermost circumferential groove 26 is elongated downward, as illustrated in FIG. 9A. The oil hole 27 having, on a radially outer side, an opening that is long in the top-bottom direction reaches an upper end of the skirt part 1 and has a cross-sectional shape having, on a lower side, an inclined surface 27*a* that is curved inward, as illustrated in FIG. 9B.

It is anticipated that the oil hole 27 that is elongated downward makes it easy to supply oil from the oil hole 27 to a portion of the resin coating film 2. Furthermore, since a wall surface of the oil hole 27 on the resin coating film 2 side is the inclined surface 27*a* that is curved inward, supply of oil from the oil hole 27 to a portion of the resin coating film 2 is promoted.

A piston for an engine according to the present invention has following features (1) through (6).

(1) Lengths, in the piston movement direction 6, of the outer-edge resin coating films 2*b* are set to such a degree as to stretch over an entire length, in the piston movement direction 6, of ends, in the piston circumferential direction 8, of the skirt part 1.

Accordingly, since the length, in the piston movement direction, of the outer-edge resin coating film is set to such a degree as to stretch over the entire length, in the piston movement direction, of an end, in the piston circumferential direction, of the skirt part, it is harder for engine oil introduced into the skirt part to escape in the piston circumferential direction. This increases the effect of holding engine oil in the skirt part.

(2) The outer-edge resin coating films 2*b* are shaped so that central parts thereof in the piston movement direction 6 bulge in the piston circumferential direction 8.

Accordingly, since the central part, in the piston movement direction, of the outer-edge resin coating film bulges in the piston circumferential direction, engine oil is guided by inclined sides of the bulged part so as to be collected toward a central part, in the piston circumferential direction, of the skirt part in accordance with sliding movement of the piston. Accordingly, engine oil in the skirt part can be guided to a part of the skirt part that strongly makes contact with a cylinder in accordance with movement of the piston. This can contribute to an improvement of lubricating performance.

(3) The patchy resin coating films 2*a* have a hexagonal shape and/or an hourglass shape.

Accordingly, in cases where each of the patchy resin coating films has a hexagonal shape, engine oil is supplied to the net-like groove well due to upward and downward movement of the piston, and as a result smooth lubrication effect is obtained.

In cases where each of the patchy resin coating films has an hourglass shape, lubricating oil moving in the recessed part between patchy resin coating films that are adjacent to each other in the piston circumferential direction in accordance with movement of the piston flows out from an opening of the recessed part, and collides with and is received or bounced back by an end of a patchy resin coating film that is adjacent in the piston movement direction. This can provide an excellent engine oil holding function.

(4) A recessed pocket part 23 that is a recess of the surface 1*a* of the skirt part 1 is provided at an end, in the piston movement direction 6, of the skirt part 1.

Accordingly, oil can be accumulated in the recessed pocket part that is a recess in the surface of the skirt part at an end, in the piston movement direction, of the skirt part. The recessed pocket part can function as an oil pocket of the skirt part and therefore can contribute to a further improvement of lubricating performance.

(5) In a part of the surface 1*a* of the skirt part 1 in a direction that crosses a direction of an axis P of a piston pin, the patchy resin coating films 2*a* are provided on a rough surface 24 of the piston 12 that has been subjected to shot-peening treatment.

Accordingly, since the patchy resin coating films in a part of the surface of the skirt part in a direction that crosses an axial direction of a piston pin are provided on a surface that has been subjected to shot-peening treatment, these patchy resin coating films are less likely to peel off than patchy resin coating films coating a normal surface and therefore can contribute to an improvement of wear resistance.

(6) A circumferential resin coating film 2*c* that extends in the piston circumferential direction 8 is provided at an end, farther from a crankshaft, of the skirt part 1 on a thrust side 12*a* and/or an end, closer to the crankshaft, of the skirt part 1 on an anti-thrust side 12*b*.

Accordingly, the circumferential resin coating film functions as a continuous wall that covers, in the piston circumferential direction, an end, in the piston movement direction, of the net-like groove of the skirt part. This makes it harder for oil taken into the net-like groove to escape in the piston movement direction. This can contribute to an improvement of wear resistance. In this case, preferably, the circumferential resin coating film is provided at an end of the skirt part farther from the crankshaft on the thrust side, and the circumferential resin coating film is provided at an end of the skirt part closer to the crankshaft on the anti-thrust side since engine oil is more likely to be held in a portion that is strongly pressed against the cylinder.

What is claimed is:

1. A piston for an engine, the piston comprising:

a resin coating film and a recessed part on a surface of a skirt part, wherein resin coating films are distributed in a patchy fashion on the surface of the skirt part, and the recessed part, which is formed by the surface of the skirt part between adjacent ones of the patchy resin coating films and by the adjacent resin coating films, constitutes a net-like groove, and wherein outer-edge resin coating films extending in a piston movement direction are provided at ends, in a piston circumferential direction, of the skirt part.

2. The piston according to claim 1, wherein lengths, in the piston movement direction, of the outer-edge resin coating films are set to such a degree as to stretch over an entire length, in the piston movement direction, of ends, in the piston circumferential direction, of the skirt part.

3. The piston according to claim 2, wherein the outer-edge resin coating films are shaped so that central parts thereof in the piston movement direction bulge in the piston circumferential direction.

4. The piston according to claim 1, wherein the patchy resin coating films have a hexagonal shape and/or an hourglass shape.

5. The piston according to claim 2, wherein the patchy resin coating films have a hexagonal shape and/or an hourglass shape.

6. The piston according to claim 3, wherein the patchy resin coating films have a hexagonal shape and/or an hourglass shape.

7. The piston according to claim 1, wherein a recessed pocket part that is a recess of the surface of the skirt part is provided at an end, in the piston movement direction, of the skirt part.

8. The piston according to claim 1, wherein in a part of the surface of the skirt part in a direction that crosses an axial direction of a piston pin, the patchy resin coating films are provided on a surface of the piston that has been subjected to shot-peening treatment.

9. The piston according to claim 1, wherein a circumferential resin coating film that extends in the piston circumferential direction is provided at an end, farther from a crankshaft, of the skirt part on a thrust side and/or an end, closer to the crankshaft, of the skirt part on an anti-thrust side.

* * * * *